United States Patent
Nishino et al.

(10) Patent No.: US 11,286,006 B2
(45) Date of Patent: Mar. 29, 2022

(54) WHEEL HOUSE STRUCTURE

(71) Applicant: HONDA MOTOR CO., LTD., Tokyo (JP)

(72) Inventors: Masataka Nishino, Wako (JP); Akira Hojo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 247 days.

(21) Appl. No.: 16/824,215

(22) Filed: Mar. 19, 2020

(65) Prior Publication Data
US 2020/0307716 A1    Oct. 1, 2020

(30) Foreign Application Priority Data
Mar. 28, 2019    (JP) ............................ JP2019-062543

(51) Int. Cl.
B62D 25/18    (2006.01)
B62D 25/16    (2006.01)

(52) U.S. Cl.
CPC ........... B62D 25/18 (2013.01); B62D 25/163 (2013.01)

(58) Field of Classification Search
CPC ..... B62B 25/18; B62B 25/163; B62B 35/008; B60R 19/48
See application file for complete search history.

(56) References Cited

U.S. PATENT DOCUMENTS

| | | | | |
|---|---|---|---|---|
| 8,991,868 B2 * | 3/2015 | Ward | ...................... | B62D 25/18 |
| | | | | 280/851 |
| 9,248,869 B2 * | 2/2016 | Neculau | ............... | B62D 25/082 |
| 10,633,034 B2 * | 4/2020 | Miwa | ...................... | B62D 25/18 |

FOREIGN PATENT DOCUMENTS

| | | | | |
|---|---|---|---|---|
| DE | 102006029351 B3 * | 9/2007 | .......... | B62D 29/048 |
| DE | 102014206364 A1 * | 10/2015 | ............... | B60T 5/00 |
| DE | 102017006837 A1 * | 1/2019 | ........... | B62D 25/163 |
| JP | 2012116264 A * | 6/2012 | ............. | B62D 25/18 |
| JP | 5283951 B2 * | 9/2013 | | |
| JP | 2015155226 A * | 8/2015 | | |
| JP | 6138176 B2 | 5/2017 | | |
| KR | 960003519 Y1 * | 4/1996 | | |
| KR | 0112681 Y1 * | 4/1998 | | |
| WO | WO-2016092164 A1 * | 6/2016 | ............. | B62D 25/16 |

* cited by examiner

*Primary Examiner* — Steve Clemmons
(74) *Attorney, Agent, or Firm* — Rankin, Hill & Clark LLP

(57) ABSTRACT

A wheel house structure including a bumper forming a part of a wheel arch part on a lower side of a vehicle body; an inner fender disposed inside the bumper in a vehicle width direction; and a connection cover member connecting the bumper and the inner fender and being a separated member from the inner fender. The connection cover member includes a sandwiching part to connect to the bumper. The bumper includes an extension part lengthening toward an inside relative to the wheel arch part in the vehicle width direction. The sandwiching part of the connection cover member is disposed on a center side relative to the extension part in a radial direction of a wheel to connect to the extension part. An outer end part of the connection cover member in the vehicle width direction has a shape along the wheel arch part.

16 Claims, 6 Drawing Sheets

WHEEL HOUSE STRUCTURE

CROSS REFERENCE TO RELATED APPLICATIONS

This application claims the foreign priority benefit under Title 35, United States Code, 119 (a)-(d) of Japanese Patent Application No. 2019-062543 which is filed on Mar. 28, 2019 in the Japan Patent Office, the disclosure of which is herein incorporated by reference in its entirety.

BACKGROUND OF THE INVENTION

1. Technical Field

The present invention relates to a wheel house structure.

2. Description of Background Art

For example, a wheel house structure is disclosed in the following patent document 1. In the wheel house structure, an inner fender, which covers an outer surface of a front tire and is located inside the vehicle body, is provided with a front side wall disposed in front of the front tire, an opening which is formed on the vehicle outer side of the front side wall and through which a traveling wind passes, and the first rib projecting toward the vehicle front side from the peripheral edge of the opening.

Patent document 1: JP 6138176 B2

BRIEF SUMMARY OF THE INVENTION

However, the conventional wheel house structure has a projecting extension part and the like used for the connection of the inner fender and the front bumper, so that the parting does not have a constant width.

Hence, a region where the inner fender and the front bumper are connected to each other has not a good appearance.

Therefore, an object of the present invention is to provide a wheel house structure having a good appearance of a region where the inner fender and the front bumper are connected to each other.

In order to achieve the above object, there is provided a wheel house structure comprising: a bumper forming a part of a wheel arch part on a lower side of a body of a vehicle; an inner fender disposed inside the bumper in a vehicle width direction; and a connection cover member connecting the bumper and the inner fender and being a separated member from the inner fender, wherein the connection cover member includes a sandwiching part to connect to the bumper, wherein the bumper includes an extension part lengthening toward an inside relative to the wheel arch part in the vehicle width direction, wherein the sandwiching part of the connection cover member is disposed on a center side relative to the extension part in a radial direction of a wheel to connect to the extension part, and wherein an outer end part of the connection cover member in the vehicle width direction has a shape along the wheel arch part.

According to the present invention, a wheel house structure having a good appearance of a region where the inner fender and the bumper are connected to each other can be provided.

BRIEF DESCRIPTION OF THE SEVERAL VIEWS OF THE DRAWINGS

Certain preferred embodiments of the present invention will now be described in greater detail by way of example only and with reference to the accompanying drawings, in which.

DETAILED DESCRIPTION OF THE INVENTION

An embodiment of the present invention will be described in detail appropriately with reference to the attached drawings. The same symbol is referred to the same element, and duplicated explanation is omitted. In an explanation of a direction, "front", "rear", "left", "right", "upper", and "lower" are based on a viewpoint of a driver except a case of a specific mention. Furthermore, a "vehicle width direction" is the same as a "left-right direction".

Figure 1:
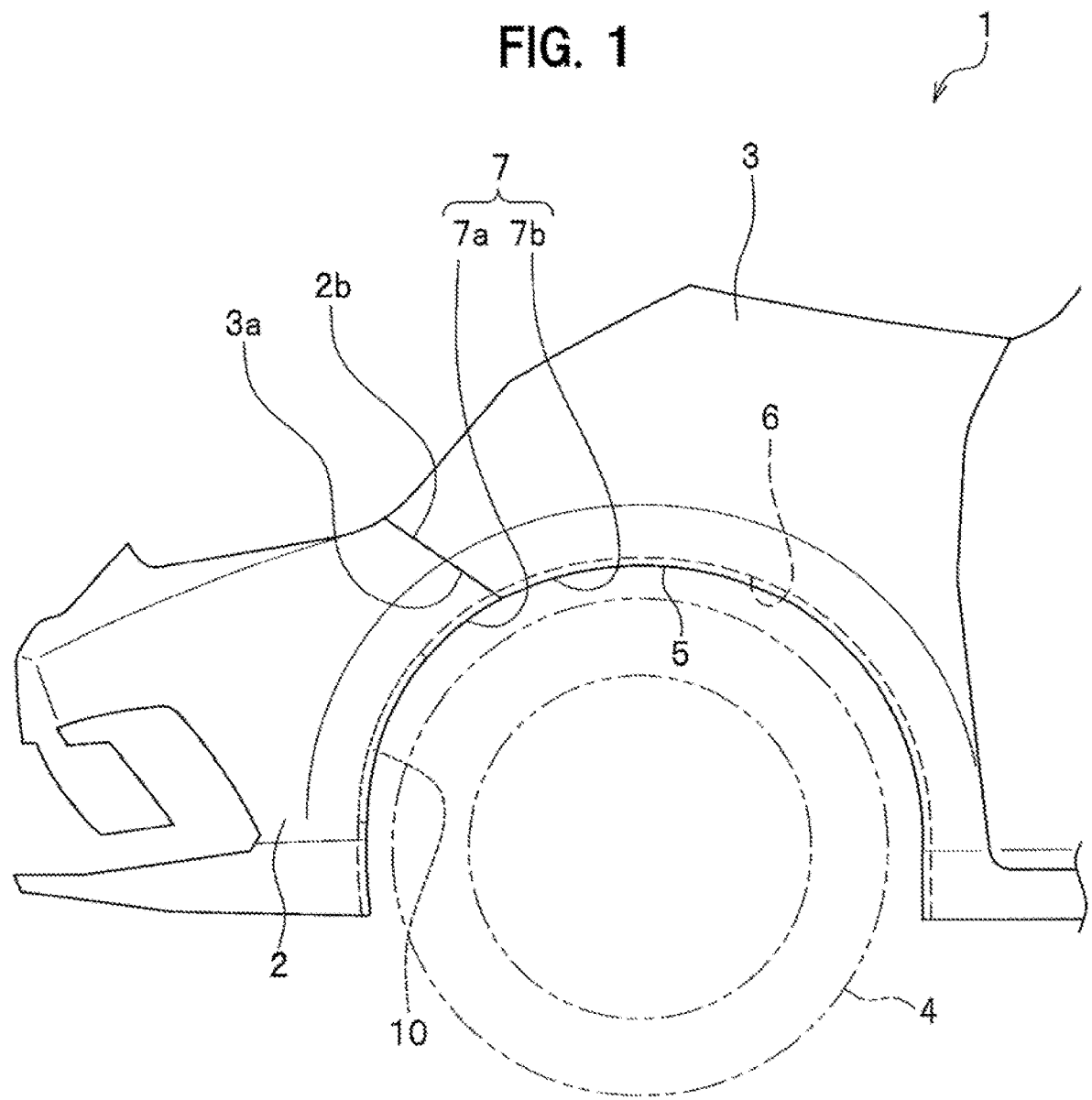
FIG. 1 is a side view of a front part of a vehicle having a wheel house structure of an embodiment of the present invention.

FIG. 1 shows a vehicle 1 having a wheel house structure of an embodiment of the present invention. A front bumper 2 and an outer fender 3 are provided to a front part of the vehicle 1. A wheel house 5 is formed around a front wheel 4. The wheel house 5 has an inner fender 6 having an arc shape so as to face an outer peripheral surface of the front wheel 4.

The front bumper 2 is in contact with a front end part 3a of the outer fender 3 at a rear end part 2b of the front bumper 2.

Thus, a front arch 7a of the front bumper 2 is connected to a rear arch 7b located outside the inner fender 6 in the vehicle width direction, so that a wheel arch part 7 having a semicircle shape in a view from the side is formed at the outer edge part of the wheel house 5.

Figure 2:
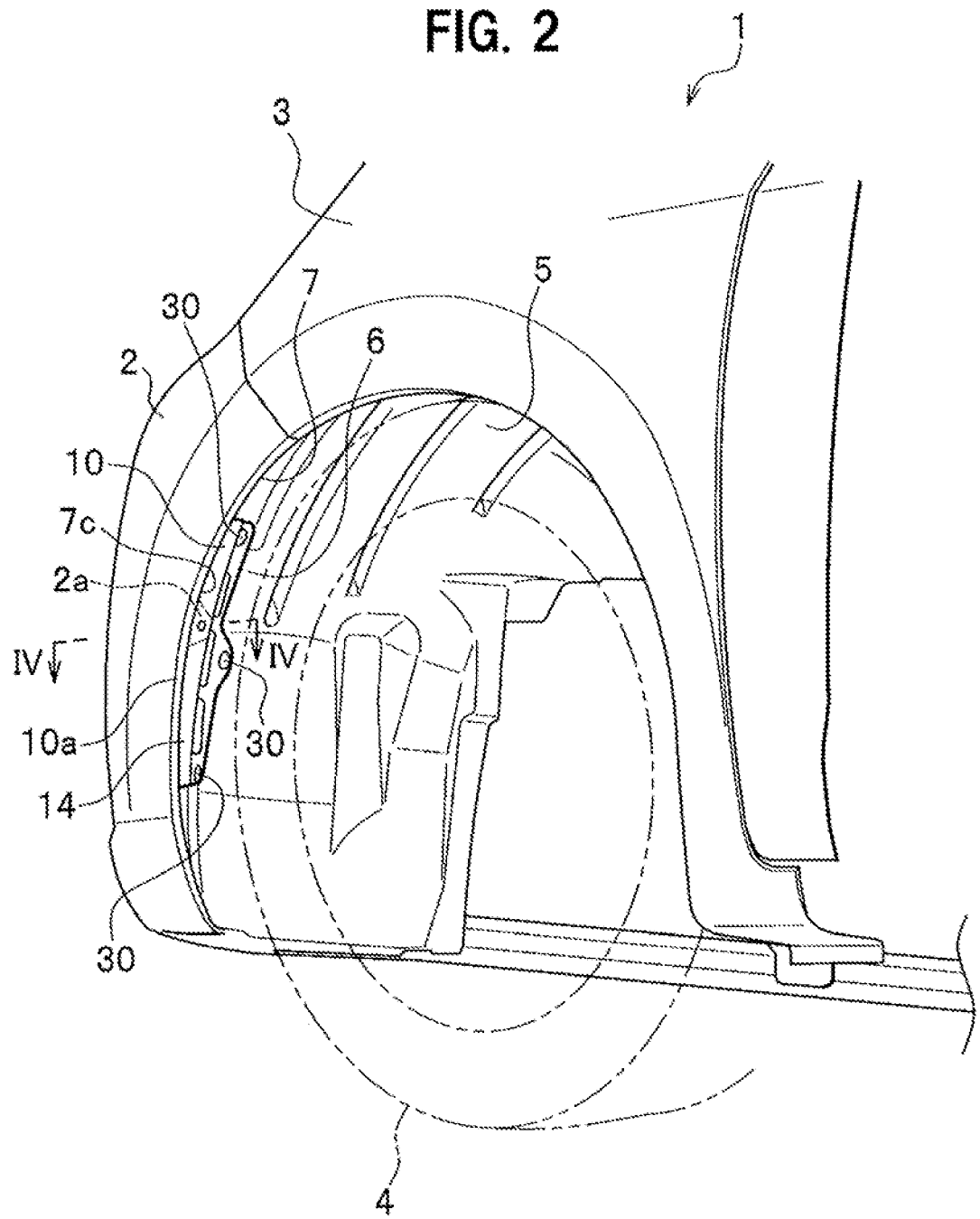
FIG. 2 is a perspective view of the wheel house of the embodiment seen obliquely from the rear to explain a connection structure of the wheel house structure of the embodiment.

As shown in FIG. 2, a connection cover member 10, which connects the front bumper 2 and the inner fender 6, is provided to the wheel house 5 covering the front wheel 4 of the vehicle 1.

The connection cover member 10 of this embodiment is a member separated from the inner fender 6, and has higher rigidity than the inner fender 6. Furthermore, the connection cover member 10 has a larger thickness than the inner fender 6. However, the connection cover member 10 is not limited to this embodiment, and may be made of resin materials having higher rigidity than that of the inner fender 6. Furthermore, the connection cover member 10 may be made of resin materials having higher rigidity and a larger thickness.

Furthermore, the connection cover member 10 has a connection plate part 12 (refer to FIGS. 3 and 4) to be connected to the front bumper 2, a sandwiching part 14 lengthening in a vehicle upper-lower direction along the wheel arch part 7, and a plurality of fasteners 30 such as clips to be connected to the inner fender 6.

Figure 3:
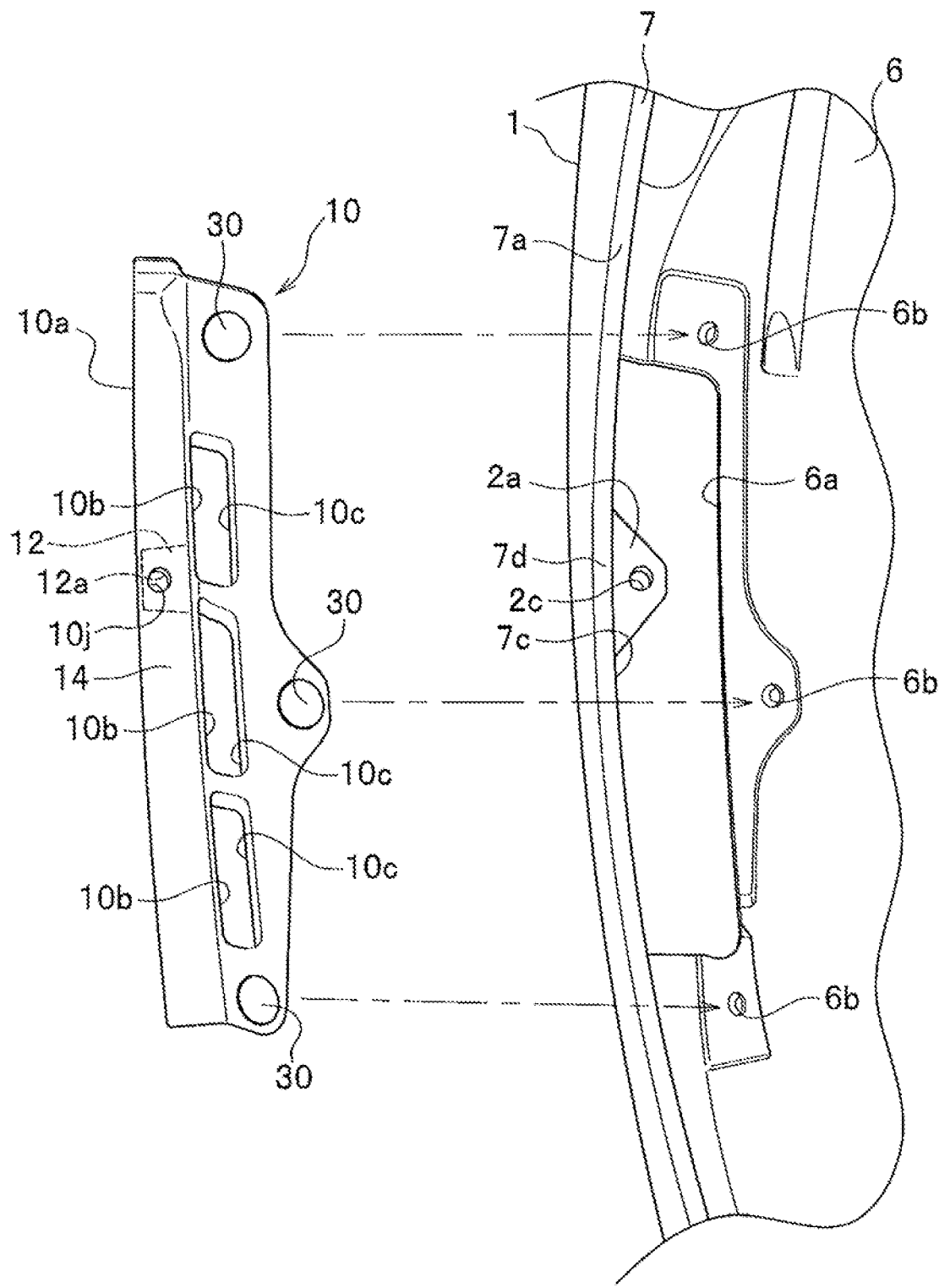
FIG. 3 is a perspective view of apart of the wheel house structure of the embodiment seen obliquely from the rear, showing the connection structure using a connection cover member.

As shown in FIG. 3, the front bumper 2 has a flange part 7d lengthening toward the inside in the vehicle width direction from the wheel arch part 7. Furthermore, an extension part 2a having a tongue shape lengthens from the inner edge of the flange part 7d in the vehicle width direction. And a through hole 2c is formed in the extension part 2a.

The connection cover member 10 is connected to the front bumper 2 while the sandwiching part 14 is located on the center side relative to the extension part 2a in a radial direction of the front wheel.

Figure 4:
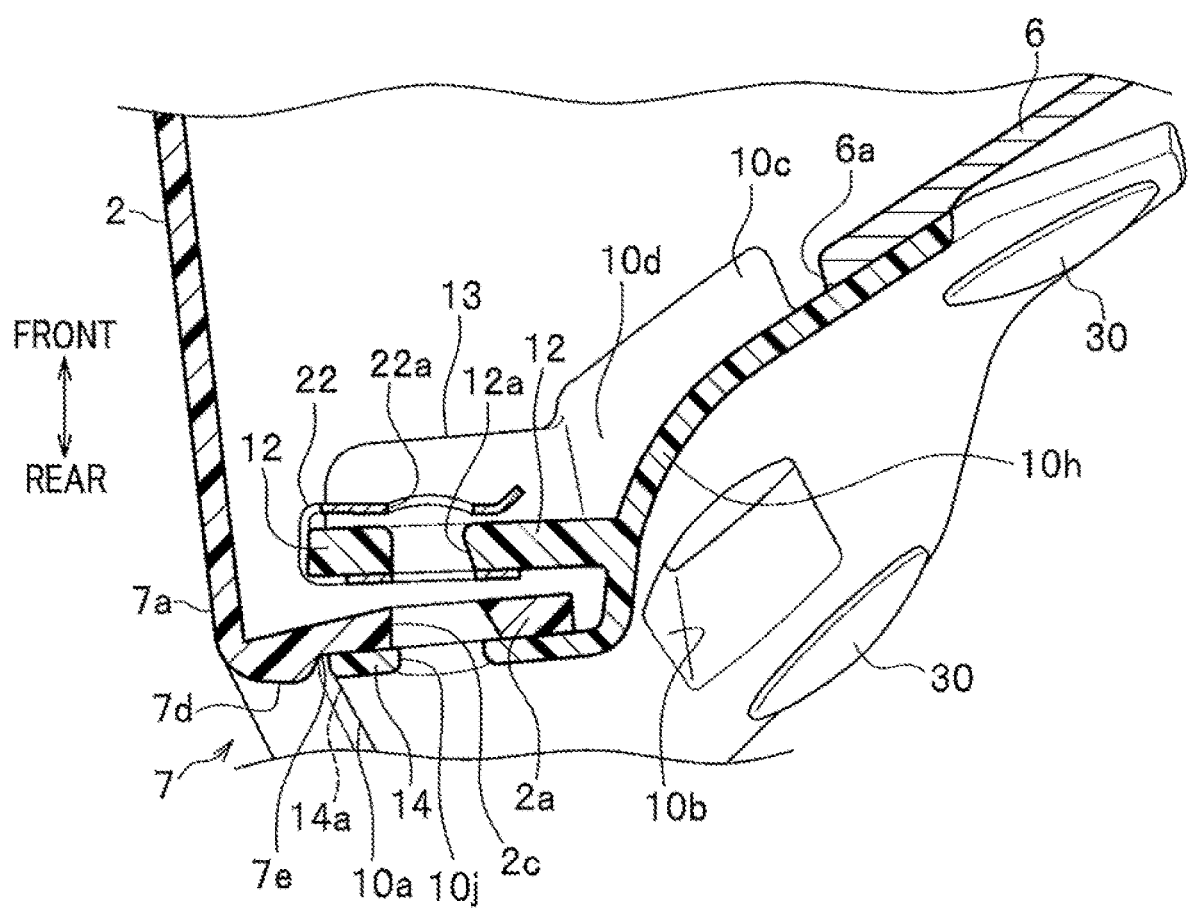
FIG. 4 is an enlarged cross sectional view taken along the line IV-IV of FIG. 2.

Namely, as shown in FIG. 4, there is a space, in which the extension part 2a can be inserted, between the connection plate part 12 of the connection cover member 10 and the sandwiching part 14 of the connection cover member 10. The extension part 2a intermediates in the space as shown in FIG. 4, and then the extension part 2a, the sandwiching part 14 and the connection plate part 12 are fastened by a bolt member 20 to be described later (refer to FIG. 6). Thus, the connection plate part 12 of the connection cover member 10 comes into contact with the extension part 2a from the outer side relative to the extension part 2a in the radial direction of the front wheel. Furthermore, the sandwiching part 14 comes into contact with the extension part 2a from the center side in the radial direction of the front wheel. Consequently, the sandwiching part 14 is located on the center side relative to the extension part 2a and the connection plate part 12 in the radial direction of the front wheel, so that the connection cover member 10 is stably connected to the front bumper 2.

In detail, a through hole 10j is formed in the sandwiching part 14 of the connection cover member 10. The through hole 10j is located substantially at the middle of the sandwiching part 14 in the upper-lower direction. Furthermore, an attachment hole 12a is formed in the connection plate part 12 at the same position as the through hole 10j.

Figure 6:
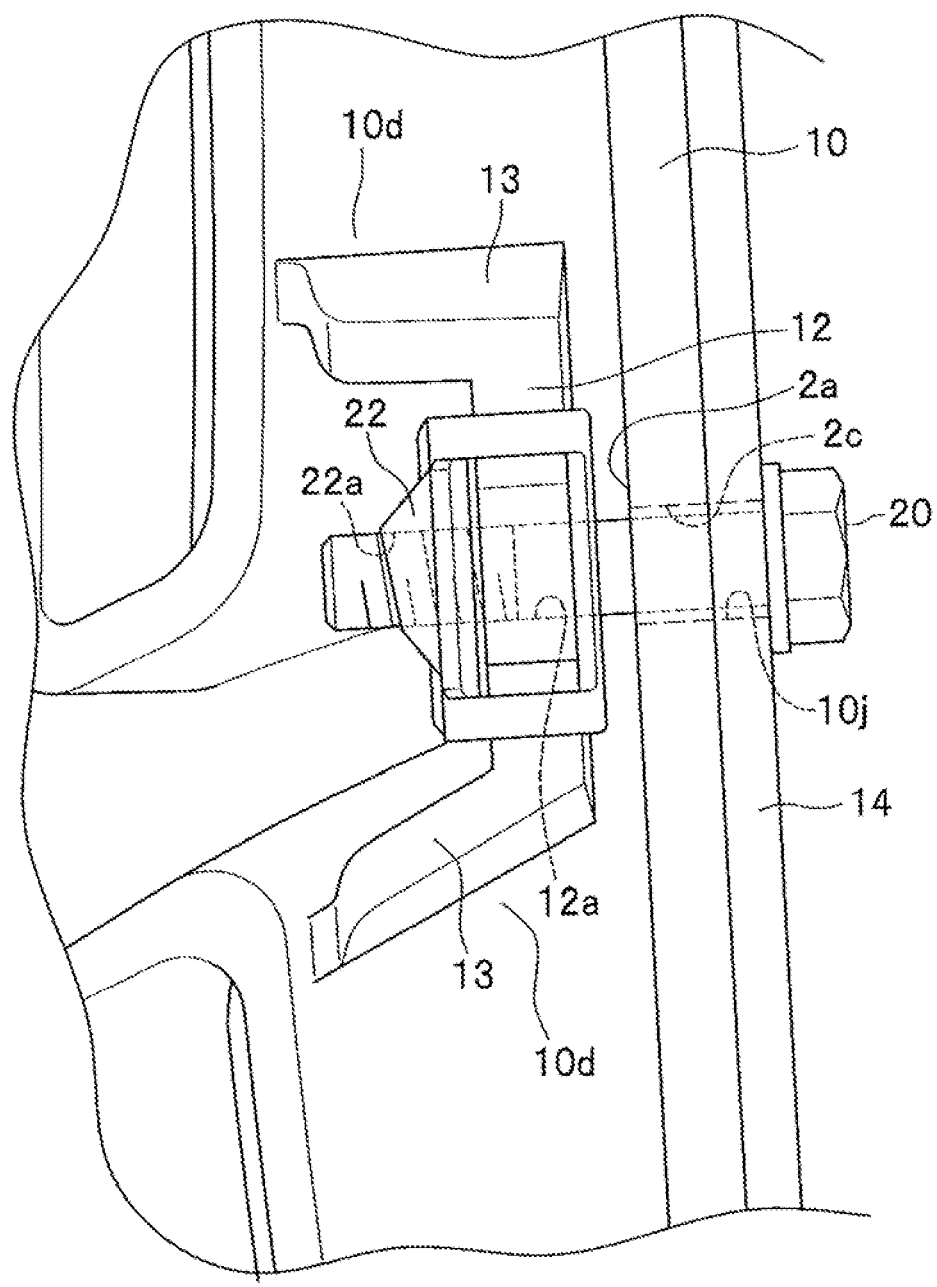
FIG. 6 is a side view of a connection plate part of the connection cover member in a view along the arrow line VI of FIG. 5.

Thereby, as shown in FIG. 6, the sandwiching part 14 is fastened to the extension part 2a by the bolt member 20, so that the sandwiching part 14 is located on the center side relative to the extension part 2a in the radial direction of the front wheel and accurately located at a desired position. The connection cover member 10 is connected to the inner fender 6 also by the fasteners 30 (refer to FIG. 2).

Thus, the connection cover member 10 connects the front bumper 2 and the inner fender 6, and the sandwiching part 14 is located on the center side relative to the extension part 2a of the front bumper 2 in the radial direction of the front wheel and inside the front bumper 2 in the vehicle width direction, so that the extension part 2a can be covered.

As shown in FIG. 3, an outer end part 10a of the connection cover member 10 in the vehicle width direction is attached along the flange part 7d (refer to also FIGS. 2 and 4). The outer end part 10a of the connection cover member 10 is approximately straight in the upper-lower direction in a view from the rear, and is curved along a side edge 7c of the wheel arch part 7.

Consequently, the side edge 7c of the front bumper 2, the side edge 7c including the extension part 2a, cannot be seen because the side edge 7c is covered by the outer end part 10a of the connection cover member 10. Therefore, the parting of the wheel arch part 7 can have a constant width.

The inner fender 6 has an opening 6a long in the upper-lower direction along the wheel arch part 7. The opening 6a is formed along the front arch 7a of the wheel arch part 7 of the front bumper 2 so that the traveling wind can pass through the opening 6a.

Figure 5:
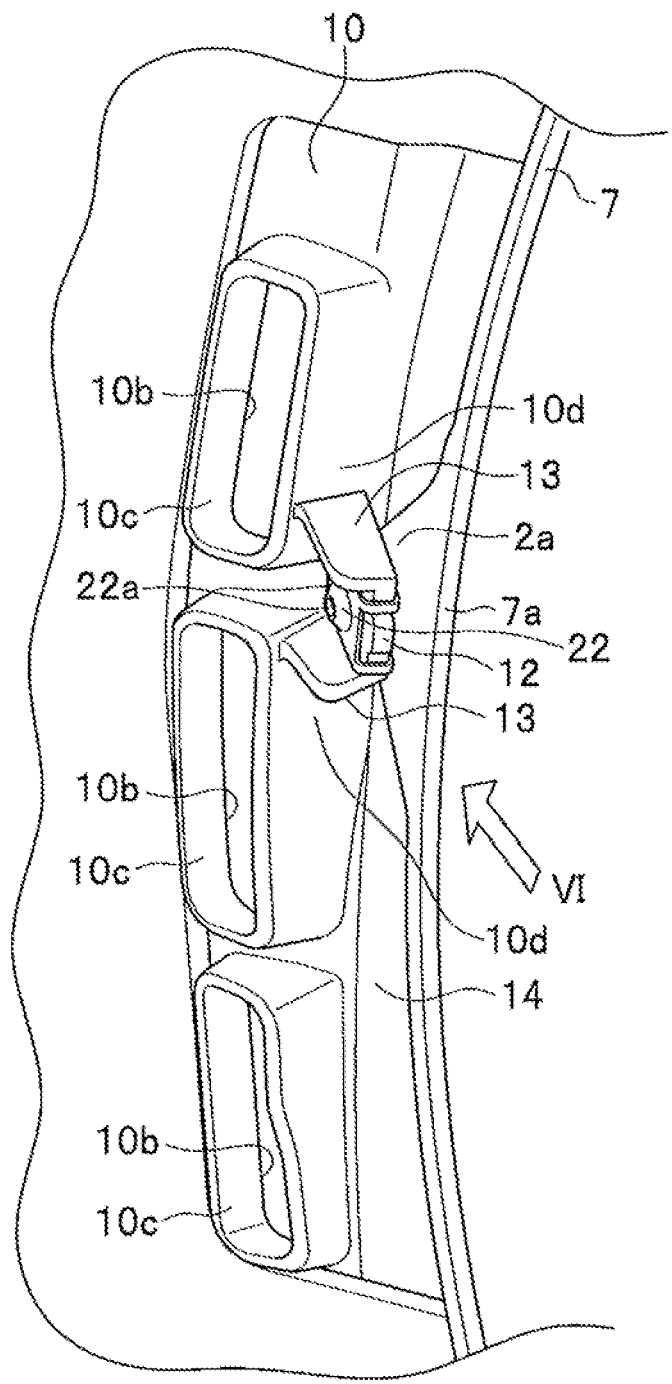
FIG. 5 is a perspective view of the connection cover member seen obliquely from the front.
Figure 5:
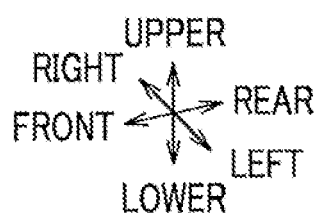

The connection cover member 10 has a plurality of vent holes 10b communicating with the opening 6a. As shown in FIG. 5, the connection cover member 10 has a plurality of ribs 10c. Each rib 10c has a cylindrical shape and lengthens outside a peripheral edge of the corresponding vent hole 10b in the radial direction of the front wheel from the peripheral edge of the corresponding vent hole 10b.

The connection plate part 12 of the embodiment is projected toward an outer end part in the vehicle width direction from a main part 10h of the connection cover member 10 so that the connection plate part 12 is parallel with the sandwiching part 14. Furthermore, the connection cover member 10 is provided with a pair of side plate parts 13, 13 as a support part supporting the connection plate part 12.

These two side plate parts 13, 13 each have a flat wall shape and they are parallel with each other with a constant distance. Each rib 10c surrounds the corresponding vent hole 10b, and the ribs 10c, 10c, 10c are juxtaposed. Each side plate part 13 is projected from a corresponding rib 10c of adjacent ribs 10c, 10c.

These two side plate parts 13, 13 are connected to both ends of the connection plate part 12 in the upper-lower direction to support the connection plate part 12. That is, one side plate part 13, the connection plate part 12 and the other side plate part 13 form a shape astride the adjacent ribs 10c, 10c.

In other words, two side plate parts 13, 13 connected to the connection plate part 12 and the connection plate part 12 form a shape of a laid substantial "u" letter (refer to FIG. 6) in a view along the arrow line VI of FIG. 5.

As shown in FIGS. 4, 5, a fixing metal member 22 is attached to the connection plate part 12. The fixing metal member 22 has a cross section shape of a laid substantial "u" letter in a side view. One side plate part of the fixing metal member 22 is provided with a female thread part 22a to be engaged with the bolt member 20.

As shown in FIG. 6, the bolt member 20 as a fastening member is inserted into the through hole 10j of the sandwiching part 14, the through hole 2c of the extension part 2a, the fixing metal member 22, and the attachment hole 12a of the connection plate part 12, and is engaged with the female thread part 22a of the fixing metal member 22 to fasten them. Thus the connection cover member 10 is fixed to the front bumper 2.

Furthermore, as shown in FIG. 3, the fasteners 30 of the connection cover member 10 are inserted in attachment holes 6b formed in the inner fender 6 to fix them. Thus, the connection cover member 10 is fixed to the inner fender 6.

Next, an operation and effect of the wheel house structure of the embodiment will be explained.

As shown in FIG. 1, in the embodiment, the front bumper 2 forming a part of the wheel arch part 7 by the lower side part thereof, the inner fender 6 disposed inside the front bumper 2 in the vehicle width direction, and the connection cover member 10 being a member separated from the inner fender 6 and connecting the front bumper 2 and the inner fender 6 are provided to the front part of the vehicle 1.

As shown in FIGS. 2, 4, the front bumper 2 has the extension part 2a lengthening toward the inside in the vehicle width direction from the inner edge of the flange part 7d of the wheel arch part 7, and connects with the connection cover member 10 by disposing the sandwiching part 14 on the center side relative to the extension part 2a in the radial direction of the front wheel. Furthermore, the outer end part 10a of the connection cover member 10 in the vehicle width direction is formed along the shape of the wheel arch part 7.

Thus, an appearance of the region where the inner fender 6 and the front bumper 2 are connected to each other can be improved.

In detail, the sandwiching part 14 of the connection cover member 10 is disposed on the center side relative to the extension part 2a in the radial direction of the front wheel, so that the front bumper 2 is connected with the inner fender 6 in the state that the extension part 2a of the front bumper 2 is hidden by the connection cover member 10.

Therefore, the parting between the front bumper 2 and the inner fender 6 can have a constant width. In such a way, according to the wheel house structure of the embodiment, an appearance of the region of the wheel arch part 7 where the inner fender 6 and the front bumper 2 are connected to each other can be improved.

Since the outer end part 10a of the connection cover member 10 in the vehicle width direction is formed along the shape of the wheel arch part 7, the parting is more uniform. Therefore, an appearance of the parting region can be improved.

Furthermore, the connection cover member 10 is formed by another member separated from the inner fender 6. For this reason, the inner fender 6 can be located on the front side relative to the wheel arch part 7 of the front bumper 2. Therefore, the inner fender 6 can be suppressed from having raveling or damage because of the traveling wind.

The front bumper 2 has the flange part 7d lengthening toward the inside in the vehicle width direction from the wheel arch part 7. Furthermore, the extension part 2a lengthens from the inner edge of the flange part 7d in the vehicle width direction. And further, the sandwiching part 14 of the connection cover member 10 is disposed on the center side relative to the extension part 2a in the radial direction of the front wheel. The outer end part 10a of the connection cover member 10 in the vehicle width direction is formed along the flange part 7d, in the curved shape along the side edge 7c of the wheel arch part 7 and linearly in the upper-lower direction in a rear view.

In the embodiment, the sandwiching part 14 of the connection cover member 10 is disposed on the center side in the radial direction of the front wheel relative to the extension part 2a lengthening from the inner edge of the flange part 7d in the vehicle width direction. And the outer end part 10a of the connection cover member 10 in the vehicle width direction is formed along the flange part 7d. Thereby, an outer edge part 14a of the sandwiching part 14 is embedded and hidden by a projecting portion of the flange part 7d, furthermore, the parting is made constant to improve an appearance of the parting region.

In the embodiment, as shown in FIG. 4, the outer edge part 14a of the sandwiching part 14 is disposed in and along a recessed part 7e formed along the flange part 7d. Hereby, a position of the outer edge of the sandwiching part 14 of the connection cover member 10 in the vehicle width direction aligns. Therefore, the parting becomes more constant and an appearance of the parting region can be improved.
Furthermore, the through hole 10j and the attachment hole 12a can be easily aligned with the through hole 2c, so that attachment workability is good.

The connection cover member 10 is made of materials such as synthetic resins, and has higher rigidity than that of the inner fender 6. In such a way, by making the rigidity of the connection cover member 10 higher than the inner fender 6, deformation or falling of the connection cover member 10 can be restrained.

Furthermore, the rigidity of the connection between the inner fender 6 and the front bumper 2 can be secured, so that falling or detachment of the inner fender 6 because of the traveling wind can be restrained.

As shown in FIG. 3, the inner fender 6 has an opening 6a to pass therethrough the traveling wind, the opening 6a being formed along the wheel arch part 7 of the front bumper 2. And the connection cover member 10 has the vent holes 10b to communicate with the opening 6a, ribs 10c each of which lengthens outside a peripheral edge of the corresponding vent hole 10b in the radial direction of the front wheel from the peripheral edge of the corresponding vent hole 10b, the connection plate part 12 lengthening toward the outer end part of the front bumper 2 in the vehicle width direction from the main part 10h of the connection cover member 10, and the sandwiching part 14 locating on the center side in the radial direction of the front wheel relative to the connection plate part 12 with an adequate distance between the connection plate part 12 and the sandwiching part 14.

Furthermore, the extension part 2a is disposed between the connection plate part 12 and the sandwiching part 14.

According to the wheel house structure of the embodiment, since each rib 10c lengthens outside a peripheral edge of the corresponding vent hole 10b in the radial direction of the front wheel from the peripheral edge of the corresponding vent hole 10b, the rigidity of the connection cover member 10 is further enhanced.

The extension part 2a is disposed between the connection plate part 12 and the sandwiching part 14 and sandwiched from both sides of the front and the rear. Thereby, the rigidity of a region where the connection cover member 10 and the extension part 2a are connected to each other is enhanced to restrain falling or detachment of the connection cover member 10 because of the traveling wind.

The plurality of vent holes 10b are formed in the connection cover member 10. The pair of side plate parts 13, 13 are each projected from one of the adjacent ribs 10c, 10c, each of which lengthens from the corresponding vent hole 10b, and support the connection plate part 12. Thus, one side plate part 13, the connection plate part 12 and the other side plate part 13 are sequentially connected, so that the adjacent ribs 10c, 10c are connected to each other via the connection plate part 12 and the side plates 13, 13. The connection plate part 12 and the side plate parts 13, 13 have a shape astride the adjacent ribs 10c, 10c.

The connection cover member 10 has the plurality of vent holes 10b the peripheral edge of each of which is provided with the corresponding rib 10c. Consequently, the rigidity of the connection cover member 10 is enhanced.

Furthermore, the adjacent projected ribs 10c, 10c are connected by the connection plate part 12 and the side plates 13, 13 in the shape astride the adjacent ribs 10c, 10c. Therefore, the rigidity of a region between the adjacent vent holes 10b, 10b, the rigidity being originally low, is enhanced.

The side plate parts 13, 13 are connected to the connection plate part 12 at both ends of the connection plate part 12 in the upper-lower direction, so that the connection plate part 12 and the side plates 13, 13 form a shape of a laid substantial "u" letter in a view along the arrow line VI of FIG. 5.

For this reason, a desired rigidity against bending the connection plate part 12 is secured, so that the connection cover member 10 can be prevented from falling off.

The present invention is not limited to the above-described embodiment, and various modifications are possible. The above-described embodiment is an example to explain the present invention so that the invention is easily understood. Therefore, the present invention is not limited to that having all structural elements described in the above. A part of all the structural elements of one embodiment can be replaced with a structural element of another embodiment. Furthermore, it is also possible to add some structural element (s) of one embodiment to another embodiment. Further, it is also possible to delete a part of structural elements of each embodiment, or to add and/or replace another structural element. As to the above embodiment, the following modifications are possible.

In the embodiment, the connection cover member 10 is fastened to the extension part 2a of one place with use of the bolt member 20. However, the present invention is not limited to that. For example, the connection cover member 10 can be fastened to a plurality of extension parts 2a with use of a plurality of bolt members 20, each of the bolt members 20 being used for the corresponding extension part 2a. And further, a fastener member or the like can be used by replacing or together with the bolt member 20. That is, as far as the wheel house structure is a structure that the sandwiching part 14 of the connection cover member 10 is disposed on the center side relative to the extension part 2a in the radial direction of the front wheel, a shape, the total number and a placement of the fastened part are not limited specifically.

DESCRIPTION OF REFERENCE NUMERALS

1 Vehicle
2 Front Bumper
2a Extension Part
4 Front Wheel
5 Wheel House
6 Inner Fender
7 Wheel Arch Part

What is claimed is:

1. A wheel house structure comprising:
   a bumper forming a part of a wheel arch part on a lower side of a body of a vehicle;
   an inner fender disposed inside the bumper in a vehicle width direction; and
   a connection cover member connecting the bumper and the inner fender and being a separated member from the inner fender,
   wherein the connection cover member includes a sandwiching part to connect to the bumper,
   wherein the bumper includes an extension part lengthening toward an inside relative to the wheel arch part in the vehicle width direction,
   wherein the sandwiching part of the connection cover member is disposed on a center side relative to the extension part in a radial direction of a wheel to connect to the extension part, and
   wherein an outer end part of the connection cover member in the vehicle width direction has a shape along the wheel arch part.

2. The wheel house according to claim 1,
   wherein the bumper is provided with a flange part lengthening toward the inside in the vehicle width direction from the wheel arch part,
   wherein the extension part lengthens from an inner edge of the flange part in the vehicle width direction,
   wherein the sandwiching part of the connection cover member is disposed on the center side relative to the extension part in the radial direction of the wheel and the outer end part of the connection cover member in the vehicle width direction is disposed along the flange part.

3. The wheel house structure according to claim 2, wherein the connection cover member has higher rigidity than the inner fender.

4. The wheel house structure according to claim 3,
   wherein the inner fender has an opening through which a traveling wind passes, the opening being formed along the wheel arch part of the bumper,
   wherein the connection cover member includes:
      a vent hole communicating with the opening;
      a rib lengthening toward an outside in the radial direction of the wheel from a peripheral edge of the vent hole; and
      a connection plate part lengthening toward an outer end part of the bumper in the vehicle width direction from a body part of the connection cover member,
   wherein the sandwiching part is located on the center side in the radial direction of the wheel relative to the connection plate part with an adequate distance between the connection plate part and the sandwiching part, and
   wherein the extension part is located between the connection plate part and the sandwiching part.

5. The wheel house structure according to claim 4,
   wherein the vent hole is formed of a plurality of vent holes in the connection cover member,
   wherein the rib is formed of a plurality of ribs, and the plurality of ribs are each formed corresponding to one of the plurality of vent holes, and
   wherein a support part is formed so that two portions of the support part lengthen respectively from adjacent two ribs of the plurality of ribs to support and connect with the connection plate part to form a shape astride the adjacent two ribs.

6. The wheel house structure according to claim 5,
   wherein the support part has side plate parts which are connected to both ends of the connection plate part in an upper-lower direction, each of the side plate parts has a flat wall shape and a combination of the side plate parts and the connection plate part has a shape of a laid substantial "u" letter in a view in the vehicle width direction.

7. The wheel house structure according to claim 2,
   wherein the inner fender has an opening through which a traveling wind passes, the opening being formed along the wheel arch part of the bumper,
   wherein the connection cover member includes:
      a vent hole communicating with the opening;
      a rib lengthening toward an outside in the radial direction of the wheel from a peripheral edge of the vent hole; and
      a connection plate part lengthening toward an outer end part of the bumper in the vehicle width direction from a body part of the connection cover member,
   wherein the sandwiching part is located on the center side in the radial direction of the wheel relative to the connection plate part with an adequate distance between the connection plate part and the sandwiching part, and
   wherein the extension part is located between the connection plate part and the sandwiching part.

8. The wheel house structure according to claim 7,
wherein the vent hole is formed of a plurality of vent holes in the connection cover member,
wherein the rib is formed of a plurality of ribs, and the plurality of ribs are each formed corresponding to one of the plurality of vent holes, and
wherein a support part is formed so that two portions of the support part lengthen respectively from adjacent two ribs of the plurality of ribs to support and connect with the connection plate part to form a shape astride the adjacent two ribs.

9. The wheel house structure according to claim 8,
wherein the support part has side plate parts which are connected to both ends of the connection plate part in an upper-lower direction, each of the side plate parts has a flat wall shape and a combination of the side plate parts and the connection plate part has a shape of a laid substantial "u" letter in a view in the vehicle width direction.

10. The wheel house structure according to claim 1, wherein the connection cover member has higher rigidity than the inner fender.

11. The wheel house structure according to claim 10,
wherein the inner fender has an opening through which a traveling wind passes, the opening being formed along the wheel arch part of the bumper,
wherein the connection cover member includes:
    a vent hole communicating with the opening;
    a rib lengthening toward an outside in the radial direction of the wheel from a peripheral edge of the vent hole; and
    a connection plate part lengthening toward an outer end part of the bumper in the vehicle width direction from a body part of the connection cover member,
wherein the sandwiching part is located on the center side in the radial direction of the wheel relative to the connection plate part with an adequate distance between the connection plate part and the sandwiching part, and
wherein the extension part is located between the connection plate part and the sandwiching part.

12. The wheel house structure according to claim 11,
wherein the vent hole is formed of a plurality of vent holes in the connection cover member,
wherein the rib is formed of a plurality of ribs, and the plurality of ribs are each formed corresponding to one of the plurality of vent holes, and
wherein a support part is formed so that two portions of the support part lengthen respectively from adjacent two ribs of the plurality of ribs to support and connect with the connection plate part to form a shape astride the adjacent two ribs.

13. The wheel house structure according to claim 12,
wherein the support part has side plate parts which are connected to both ends of the connection plate part in an upper-lower direction, each of the side plate parts has a flat wall shape and a combination of the side plate parts and the connection plate part has a shape of a laid substantial "u" letter in a view in the vehicle width direction.

14. The wheel house structure according to claim 1,
wherein the inner fender has an opening through which a traveling wind passes, the opening being formed along the wheel arch part of the bumper,
wherein the connection cover member includes:
    a vent hole communicating with the opening;
    a rib lengthening toward an outside in the radial direction of the wheel from a peripheral edge of the vent hole; and
    a connection plate part lengthening toward an outer end part of the bumper in the vehicle width direction from a body part of the connection cover member,
wherein the sandwiching part is located on the center side in the radial direction of the wheel relative to the connection plate part with an adequate distance between the connection plate part and the sandwiching part, and
wherein the extension part is located between the connection plate part and the sandwiching part.

15. The wheel house structure according to claim 14,
wherein the vent hole is formed of a plurality of vent holes in the connection cover member,
wherein the rib is formed of a plurality of ribs, and the plurality of ribs are each formed corresponding to one of the plurality of vent holes, and
wherein a support part is formed so that two portions of the support part lengthen respectively from adjacent two ribs of the plurality of ribs to support and connect with the connection plate part to form a shape astride the adjacent two ribs.

16. The wheel house structure according to claim 15,
wherein the support part has side plate parts which are connected to both ends of the connection plate part in an upper-lower direction, each of the side plate parts has a flat wall shape and a combination of the side plate parts and the connection plate part has a shape of a laid substantial "u" letter in a view in the vehicle width direction.

* * * * *